INVENTORS
LEONARD P. FRIEDER
WALTER S. FINKEN
BY
John C. Kerr
ATTORNEY

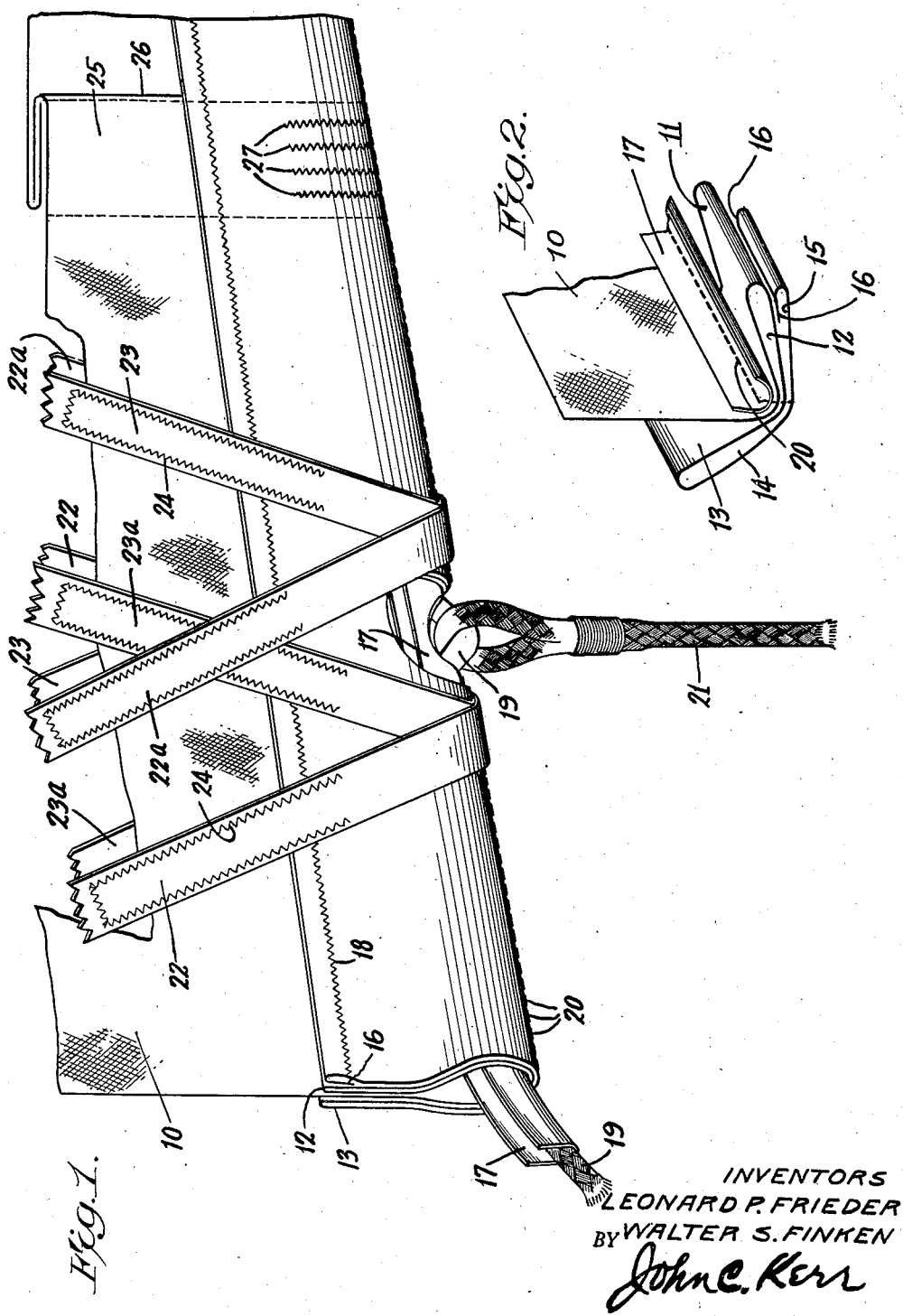
Dec. 19, 1944. L. P. FRIEDER ET AL 2,365,184
PARACHUTE
Filed Aug. 19, 1943 2 Sheets-Sheet 1
INVENTORS
LEONARD P. FRIEDER
BY WALTER S. FINKEN
John C. Kerr
ATTORNEY Dec. 19, 1944.   L. P. FRIEDER ET AL   2,365,184
PARACHUTE
Filed Aug. 19, 1943   2 Sheets-Sheet 2

Patented Dec. 19, 1944

2,365,184

UNITED STATES PATENT OFFICE 2,365,184

PARACHUTE

Leonard P. Frieder, Rockville Centre, and Walter S. Finken, Brooklyn, N. Y.; said Finken assignor to said Frieder Application August 19, 1943, Serial No. 499,170

6 Claims. (Cl. 244—145)

This invention relates generally to parachutes and has particular reference to improvements in the construction of the hems of parachute canopies as well as in the means for connecting the canopies to loads depending from the canopies.

One object of the invention is to provide a reinforced hem construction which will minimize tearing of the fabric adjacent to or constituting a part of the hem. This is effected by a construction which so distributes load stresses as to prevent imposition of those stresses on the stitches used in making the hem in such a way as to subject the stitches to what might for convenience be termed as shearing stresses. Viewed from another aspect, the hem construction is such that the stresses imposed upon the canopy through the hem are so applied to canopy that the full strength of the canopy material is utilized in resisting the stresses.

Another object is to provide a hem construction which is well reinforced so as to make it adaptable to taking and supporting heavy loads.

Another object is to provide a construction which will act to absorb the shock to the canopy when the canopy opens to support its load. This is accomplished by a connection between the shroud lines and the canopy which will yield as a load is assumed and which will so adjust itself when the canopy is expanded under load so as not to cut down the effective area of the canopy.

With the foregoing and other objects in view the invention consists in a novel construction and relation of parts, one embodiment of which is illustrated in the drawings accompanying and forming a part of this specification, and the novel features of which are pointed out in the claims appended thereto.

In the drawings:

Fig. 1 illustrates a short section of a hem constructed according to the invention and also illustrates the shock absorbing feature of the connection between the canopy and the shroud lines of the parachute.

Fig. 2 is a diagram illustrating the construction of the canopy hem with the parts spread open to give a better idea of the components of the hem.

Figure 3:
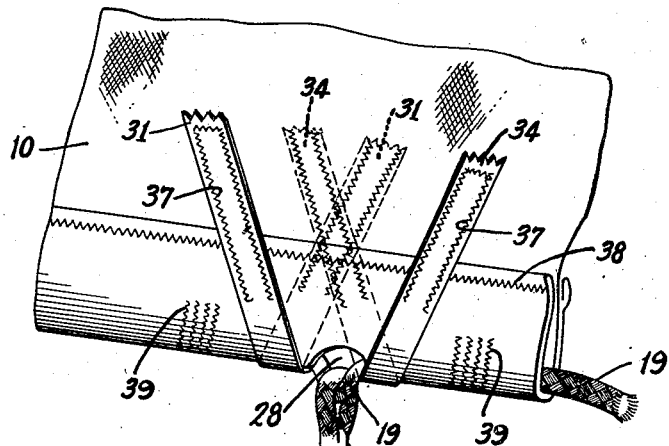
Fig. 3 is somewhat along the line of Fig. 1, but illustrates a modification which is particularly useful in parachutes which are smaller or intended for lighter loads than the one illustrated in Fig. 1.

Referring to Fig. 1 of the drawings, the fabric of which the canopy is composed is shown at 10. Ordinarily the hem around the canopy has heretofore been made by simply folding back the margin of the canopy and stitching it to one side or face of the canopy. When the canopy expands to take its load such a hem has a tendency to roll; that is, the turned back material will be stressed and the threads of the stitches will be pulled down on that side of the canopy so that the threads instead of being at right angles to the body of the canopy material will be at quite a sharp angle. This will cause the stitch threads to localize the load stresses on the canopy material in such a way that there is a tendency for the stitches to pull through the canopy fabric and, in addition, the threads will be subjected to a strain which is somewhat in the nature of a shearing stress and, as a result, the stitches are likely to rupture.

The construction illustrated in Figs. 1 and 2 overcomes this objection. In that construction the material of the canopy 10 is folded as shown in Fig. 2 to provide a plurality of plies of the material on either side of the canopy to constitute the hem of the canopy. In the construction shown in Figs. 1 and 2 the material is first folded to provide the ply 11 and then is again folded to provide the plies 12 and 13 and is then folded again to provide the plies 14 and 15. A narrow in-fold 16 is then made to protect the raw edge of the fabric from fraying and raveling and to further reinforce the hem.

After the material has been folded as just described a tape 17 is placed along a line intermediate to the edges of the folds and is stitched in place by a row or rows of stitches 20 running through the tape and the folds or plies 11 to 16, inclusive. The tape 17 is preferably strong and closely woven. After such a row or rows of stitches has been put in, the folds 11 to 16 are brought up to the position shown in Fig. 1 and one or more rows of zig-zag or elastic stitches 18 are made through all of the plies and folds with the material 10 of the canopy between them. This makes a multi-ply hem which is internally reinforced by the tape 17, leaving a tubular construction for the hem in which a load supporting and hem reinforcing cord 19 is threaded. Any load on the hem and cord will be suspended from both sides of the canopy 10 and any strain on the stitches will be distributed to the stitches on both sides of the hem seam. In other words, the canopy 10 is, in effect, clamped in the hem. When threaded through the tubular hem the cord mentioned will lie in the tape 17 as indicated at the left of Fig. 1.

In addition to holding the tape 17 in place, the stitching 20 plays an important part in relieving much of the shearing strain on the zig-zag stitching 18 at the top of the hem. The material 10 of the canopy proper is held by both the threads of 20 and 18 at the top of the hem and at the base of the folds. In the completed hem the threads 20 extend through the tape 17 and the hem folds substantially parallel to the material or fabric of the canopy 10. When the zig-zag threads of 18 are stressed on both sides of the canopy fabric 10 the threads of the fabric, which is cut on a bias, will be distorted. When the combined stretch or distortion of the threads of the zig-zag stitches 18 and the canopy fabric between them and the bottom folds of the hem have reached a certain degree of elongation, further strain is assumed by the stitches 20. These latter stitches are preferably straight, as distinguished from zig-zag, and are preferably tightly drawn when securing the tape 17 and the plies of the hem. The tape 17 acts as a washer or protector to prevent the stitches 20 from cutting the threads of the canopy fabric 10 in addition to relieving or absorbing the strains which would otherwise be additionally imposed on the zig-zag stitches 18, thereby also preventing the latter threads from cutting the canopy fabric.

The shroud lines of the parachute are preferably looped around the hem cord 19 as indicated in Fig. 1. This is effected by cutting or perforating the hem and the tape 17 so as to expose the cord 19. In the construction illustrated, each shroud line 21 is connected to the hem cord 19 by a form of loop which is described in application Serial No. 499,306, filed August 20, 1943. At each side of each point where a shroud line is connected are two tapes, the tapes of each pair crossing under the hem adjacent to the opening through which the hem cord 19 is exposed. The tapes of one pair are designated as 22 and 22a in Fig. 1, the other pair being designated as 23 and 23a. For the purpose of clarity the two ends of each tape have been marked alike. These four tapes are held in place by stitches 24 which are so applied that they do not pass through the hem cord 19, thereby leaving the cord free for endwise movement relative to the tape 17 and the plies of the hem.

The purpose of this freedom of movement is to allow the cord 19 to be pulled out into a loop by the shroud line 21 when the shock of the load is taken by the canopy. When the canopy is fully expanded by air resistance this loop is at least partially drawn back into the hem by the expansion of the hem so that the parts usually reassume the positions in which they are shown in Fig. 1. It is advisable to limit this endwise sliding movement of the cord 19 to prevent excessive closing or puckering of the canopy. This is preferably done at the seams 25 which join together the panels of the canopy, only one of the seams being shown in Fig. 1, by a plurality of rows of stitches 27 which extend through the fabric in the seam 25, the plies of the hem material, the tape 17, the hem cord 19 and the body of the canopy 10. In this way the endwise movement of the cord 19 relative to the hem and tape is limited by the stitches 27 at the seams 25. It should be understood that the seam 25 illustrated in Fig. 1 and the stitches are duplicated at each point where the canopy panels are seamed together thereby leaving a section between each two seams in which a limited extent of sliding movement of the cord 19 relative to the hem is permitted when the load is assumed by the canopy. The panel seams are, of course, completed before the hem is constructed and the stitches 26 of the panel seams do not pass through the hem cord 19.

When the parachute assumes its load, the shroud lines 21 will apply an equal and opposite load stress on the hem cord 19 and pull the cord out into loops. This causes the tape 17 and the folds 11 to 15 of the hem to have a frictional snubbing action on the cord 19 and by further clamping together the folds and the body 10 of the canopy produces a frictional or snubbing action on the part of the canopy material enclosed in the hem which has an important effect in relieving stress on the zig-zag stitches 18.

In the construction illustrated in Fig. 3 the tape 17 may be omitted if the load to be assumed by the parachute does not impose heavy stresses, although the multi-ply construction of the hem is otherwise substantially the same as is illustrated in Figs. 1 and 2. In this construction two tapes are used, one at each side of and close to the opening 28 through which the hem cord 19 is drawn to permit attaching the shroud line 21. In Fig. 3 the two ends of each tape are given the same number, the tape at the left (Fig. 3) of the opening 28 being designated 31, while that at the right of the opening 28 is designated as 34. Both tapes are held in place by stitches 37 which extend part way only down the hem; that is, they do not pass through the hem cord 19; or the tapes may be partly stitched on before the hem is secured by running the seam 38 and their upper ends then stitched to the canopy 10. At either side of each opening 28 the hem material and the hem cord are secured by stitches 39, the two sets of stitches being spaced apart any desired distance depending upon the size of the parachute or the load to be carried. In this construction the shroud lines 21 may draw the hem cord out into loops, with consequent puckering of the hem, until the air resistance to descent of the load causes the parachute canopy to be fully extended. This will expand the hem and draw the hem cord 19 up substantially to the position in which it is shown in Fig. 3. The tapes 31 and 34 contribute toward a frictional or shock absorbing resistance to these movements of the hem cord and, in addition, protect the fabric of the hem from being torn by the cord. Said tapes also clamp together the plies in the hem and the edge material of the canopy 10 and thereby prevent to some extent excessive strain on the stitches 38.

Figure 4:
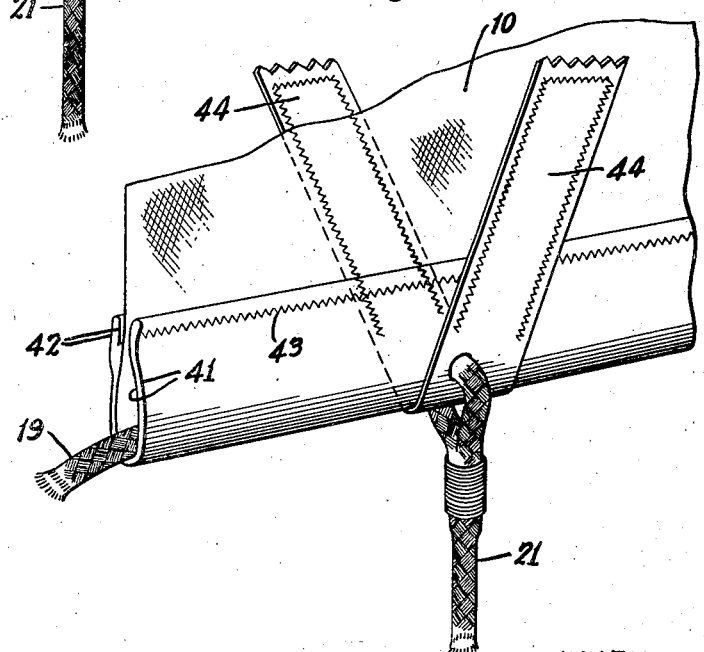
Fig. 4 is a further modification which may be used in parachutes which are not subjected to heavy loads.

The construction shown in Fig. 4 is one which will minimize rolling of the hem and shearing of the hem threads but is suitable only for lighter loads. In this construction the canopy material is folded so as to form double plies 41 of the material on one side of the hem and a double ply 42 on the other side of the hem at the point where the stitches 43 are made to hold the plies in position to complete the hem. In this construction the shock absorbing feature is not so important so the shroud lines 21 simply pass through the material of the hem and reinforcing tapes 44, which are the same in their general construction and method of attachment as the other reinforcing tapes previously mentioned, and around the hem cord 19. In this construction the load will be assumed by the hem cord 19, the material of the hem and by the reinforcing tape 44. This construction is not as desirable in many respects as the ones illustrated in the other figures, although it has a hem construction which suspends the load satisfactorily and is simpler than the constructions illustrated in the other figures.

In explaining the invention the details of the illustrative embodiments shown in the drawings have been set forth at some length, but it is not the desire to be limited by any of the details mentioned except to the extent indicated in the claims which follow.

What is claimed is:

1. A parachute structure comprising a fabric canopy having its edge folded to constitute a plurality of hem plies on the inner and on the outer surface of the canopy, zig-zag stitches along the upper edges of the plies to secure the hem folds in position, a tape along the inner bottom of the hem, stitches through the tape and the plies of the hem securing the tape and hem plies together along the bottom of the hem, a continuous cord laid along and secured to the tape at spaced apart points around the canopy hem, said cord being exposed at openings in the tape and hem plies at spaced apart points around the canopy hem, and shroud lines secured to said cord at points where the cord is exposed.

2. A parachute structure comprising a fabric canopy having its edge folded and stitched in such manner as to constitute a plurality of hem plies with the edge fabric secured between plies of the hem, a continuous cord within the hem, and extending around the canopy, a continuous tape within the hem and between the cord and the inner surface of the hem, stitches through the tape, the cord, the plies of the hem and the canopy fabric to limit movement of the cord relative to the tape, and shroud lines extending through openings in the hem and tape and secured around the cord.

3. A parachute structure comprising a fabric canopy having its edge folded and stitched in such manner as to constitute a plurality of hem plies with the fabric of the canopy secured between plies of the hem, a continuous cord within the hem and extending around the canopy, a continuous tape within the hem protecting the hem plies and frictionally retarding endwise movement of the cord, a stitched seam holding said tape in place in the hem and shroud lines looped around said cord and secured at spaced apart points around the edge of the canopy.

4. In a parachute, a fabric canopy having a sewed multi-ply hem around its edge with a plurality of hem plies on either side of the canopy proper embracing and including the edge fabric of said canopy proper, a tape along the bottom interior of the hem, stitches running longitudinally of the tape and securing said tape and at least some of said plies together, a cord running around the interior of the hem and resting along the upper face of the tape, said cord being exposed through spaced apart openings in the tape and hem material, and shroud lines having their upper ends secured to said cord where it is exposed through said openings.

5. In a parachute, a fabric canopy having its material around its edge folded back and forth to lay a multi-ply hem with plies on both sides of the canopy edge, a row of zig-zag stitches securing the plies of the hem with the canopy material between them whereby to form a multi-ply tubular hem, a tape along the bottom interior of the hem, stitches through the tape, the hem plies and the fabric of the canopy for securing said tape, hem plies and fabric of the canopy together, an endless cord laid along said tape within the hem and exposed through spaced apart openings in the hem and tape, and shroud lines secured to said cord where it is exposed through said openings.

6. A parachute structure comprising a fabric canopy having its edge folded and stitched in such manner as to constitute a tubular hem consisting of a plurality of hem plies with the edge of the fabric secured between plies of the hem, a tape constituting a washer along the bottom of the tubular hem, stitches through the tape and plies of the hem, the parts of said stitches which extend through the tape and plies being substantially in the plane of the canopy fabric, a hem cord extending along the tape, and shroud lines extending through openings in the hem and tape and secured to the hem cord.

LEONARD P. FRIEDER.
WALTER S. FINKEN.